(12) United States Patent
Kim et al.

(10) Patent No.: US 6,312,167 B1
(45) Date of Patent: Nov. 6, 2001

(54) LIGHT TRANSMISSION MODULE

(75) Inventors: Bum-soo Kim, Seoul; Hyun-kuk Shin, Suwon; Il Kim, Yongin, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/264,037

(22) Filed: Mar. 8, 1999

(30) Foreign Application Priority Data

Mar. 11, 1998 (KR) .................................................. 98-8108

(51) Int. Cl.$^7$ ...................................................... G02B 6/36
(52) U.S. Cl. ................................................ 385/89; 385/94
(58) Field of Search ................................. 385/88, 89, 92, 385/94

(56) References Cited

U.S. PATENT DOCUMENTS 4,993,803 * 2/1991 Suverison et al. .............. 250/227.11

FOREIGN PATENT DOCUMENTS

| 7-174910 | 7/1995 | (JP) | G02B/5/04 |
| 63-26608 | 2/1988 | (JP) | G02B/6/42 |
| 6-250052 | 9/1994 | (JP) | G02B/6/42 |
| 8-75956 | 3/1996 | (JP) | G02B/6/42 |

* cited by examiner

Primary Examiner—Cassandra Spyrou
Assistant Examiner—Jared Treas
(74) Attorney, Agent, or Firm—Sughrue, Mion, Zinn, Macpeak & Seas, PLLC

(57) ABSTRACT

A light transmission module for transmitting a light signal through an optical fiber coupled to a light device and/or receiving a light signal transmitted through the optical fiber is provided. The light transmission module includes a light device module having a socket member having a plurality of leads for transmitting an electrical signal, and a light device installed within the socket member to be electrically connected to the leads, for converting the electrical signal into a light signal or converting the light signal into an electrical signal, a connector module having a holder coupled to the socket member, and at least one optical fiber installed in the holder to face the light device, for transmitting the light signal, and a coupling means for slidably coupling the light device module and the connector module and packaging the same. The coupling means includes a pair of guide slots formed at one portion of both side walls of the socket member and both sides of the holder, and a pair of guide protrusions protruding at the other portion of both side walls of the socket member and both sides of the holder and slidably inserted into the respective guide slots, so that the light device module and the connector module are slidably coupled to each other.

4 Claims, 6 Drawing Sheets

LIGHT TRANSMISSION MODULE

BACKGROUND OF THE INVENTION

1. Field of the Invention

The present invention relates to a light transmission module, and more particularly, to a light transmission module for transmitting a light signal through an optical fiber coupled to a light device and/or receiving a light signal transmitted through the optical fiber.

2. Description of the Related Art

Referring to FIG. 1, a conventional light transmission module includes light devices 1, a plurality of optical fibers 3 for transmitting a light signal, an optical connector 5 for supporting the optical fiber 3, and focusing lenses 2 installed between the light device 1 and the optical fiber 3.

The light device 1 is a semiconductor laser array for converting an electrical signal into a light signal. As the semiconductor laser array, an edge emitting laser is generally employed. A light receiving module for receiving the light signal has the same configuration as that of the light transmission module with the exception of a photodetector array for converting the received light signal into an electrical signal being employed as the light device, instead of a laser array.

The light emitted from the light device 1 is focused by the focusing lens 2 and is incident into the optical fiber 3 to then be transmitted. In the light receiving configuration, the light transmitted through the optical fiber 3 is focused by a focusing lens (not shown) provided at a light emission side to then be received in a photodetector (not shown). Instead of the focusing lens 2, a flat-type waveguide (not shown) may be provided between the light device 1 and the optical fiber 3.

An optical connector 5 for supporting the plurality of optical fibers 3 includes a ferrule 6, and a plurality of alignment slots 6a on which the optical fibers are aligned are formed in the ferrule 6. The ferrule 6 is formed of a ceramic substrate. The surface of the ferrule 6 is mechanically fabricated to form the alignment slots 6a on which the optical fibers 3 each having a diameter of 50~125 μm are seated.

Since the conventional light transmission module employs the ferrule 6 which is expensive, the fabrication cost is high. Also, it is not easy to align the optical fibers 3 and the light devices 1. Also, since the focusing lenses 2 or a flat-type waveguide are necessary for coupling the light devices 1 and the optical fibers 3, the number of necessary parts increases and the system becomes complex.

SUMMARY OF THE INVENTION

To solve the above problems, it is an objective of the present invention to provide an inexpensive light transmission module which can facilitate alignment between optical fibers and light devices.

Accordingly, to achieve the above objective, there is provided a light transmission module including a light device module having a socket member having a plurality of leads for transmitting an electrical signal, and a light device installed within the socket member to be electrically connected to the leads, for converting the electrical signal into a light signal or converting the light signal into an electrical signal, a connector module having a holder coupled to the socket member, and at least one optical fiber installed in the holder to face the light device, for transmitting the light signal, and a coupling means for slidably coupling the light device module and the connector module and packaging the same.

Here, the coupling means includes a pair of guide slots formed at one portion of both side walls of the socket member and both sides of the holder, and a pair of guide protrusions protruding at the other portion of both side walls of the socket member and both sides of the holder and slidably inserted into the respective guide slots.

Also, the light transmission module preferably further includes at least one electrical wire installed at the connector module, for transmitting an electrical signal, and an electric connection means having a pair of first electrode layers formed at the respective guide slots to be electrically connected to the leads and a pair of second electrode layers formed at the respective guide protrusions to be electrically connected to the electrical wires.

The light transmission module preferably further includes a reference hole formed at one side of the socket member, and a guide member inserted into the reference hole so that the connector module coupled to the light device module is aligned. Also, the light transmission module may further include an elastic biasing means installed in the light device module, for elastically biasing the connector module coupled to the light device module to the guide member.

Here, the light device is preferably a surface emitting laser array including at least one surface emitting laser for emitting laser beams in the stacked direction of a semiconductor material layer according to an input electrical signal and/or a photodetector array including at least one photodetector for receiving an incident light signal and converting the same into an electrical signal.

Also, according to another aspect of the present invention, there is provided a light transmission module including a light device module having a base, a plurality of pins installed at one side of the base, for transmitting an electrical signal, and a light device installed on a surface of the base and electrically connected to the plurality of pins, for converting the electrical signal into a light signal and/or converting the light signal into an electrical signal, a connector module having a holder coupled to the light device module, and at least one optical fiber installed in the holder to face the light device, for transmitting the light signal, and a coupling means for slidably coupling the light device module and the connector module and packaging the same.

Here, the light transmission module may further include at least one electrical wire installed in the holder, for transmitting an electrical signal, and a contact-type electrode member installed in the holder, electrically connected to the pins by an elastic force when coupling the light device module and the connector module and electrically connected to the electrical wires, and electrically connects the light device module with the connector module, to allow transmission of an electrical signal.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Figure 2:
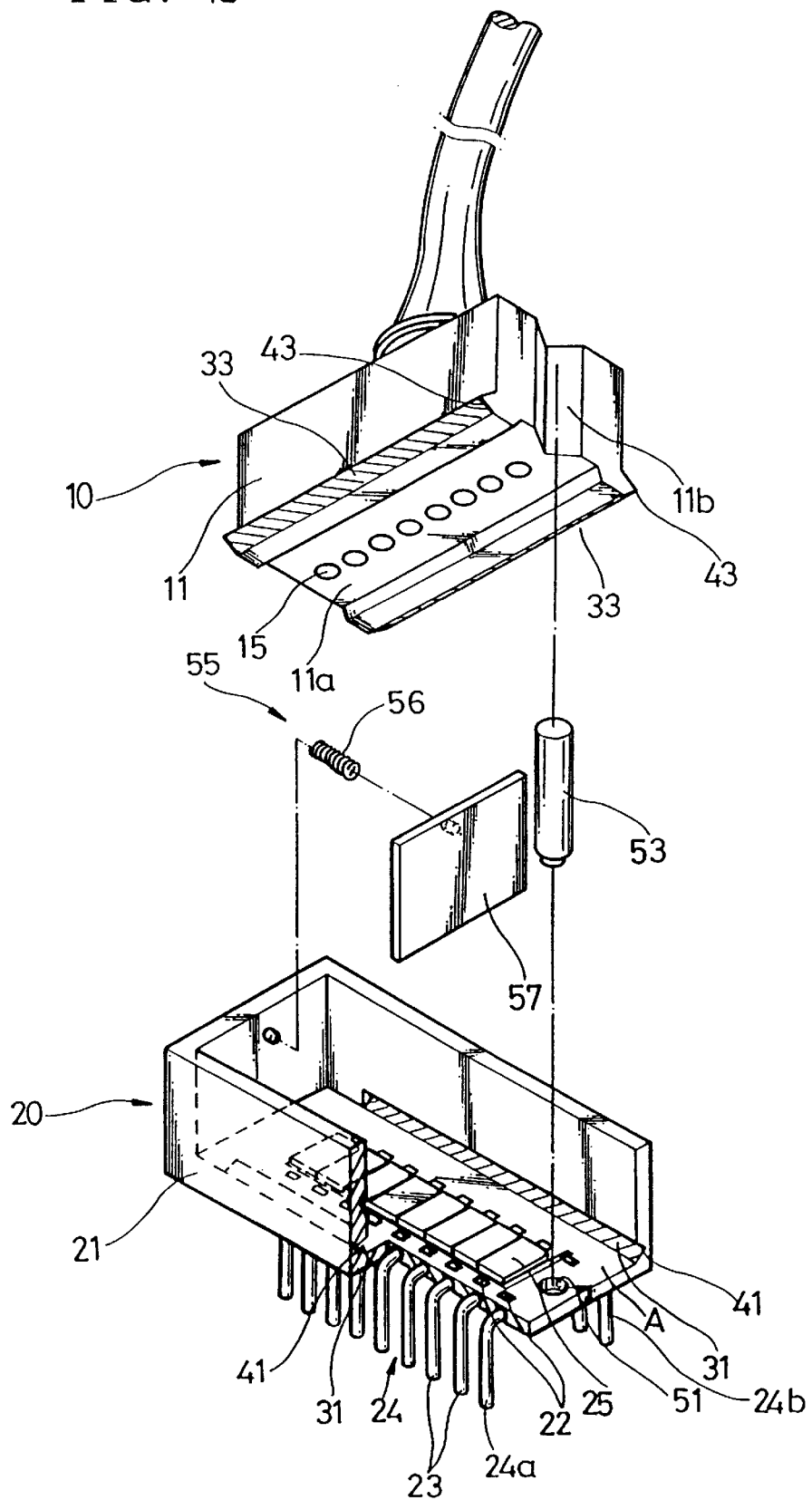
FIG. 2 is an exploded perspective view schematically illustrating a light transmission module according to an embodiment of the present invention.
Figure 3:
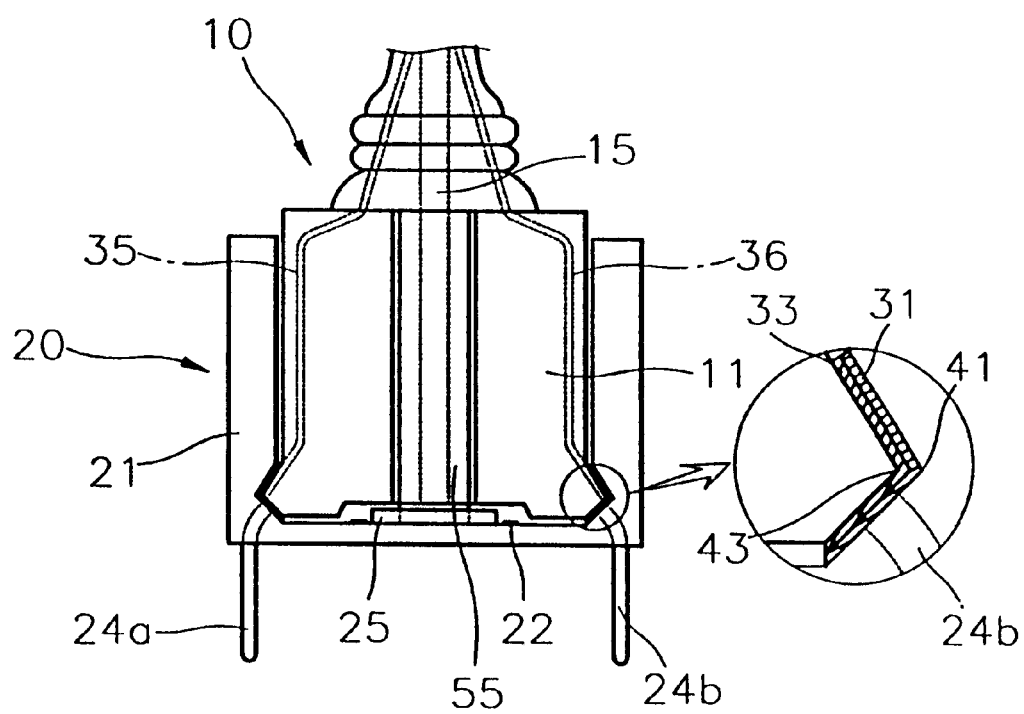
FIG. 3 is a side view illustrating the assembled state of the light transmission module shown in FIG. 2.

Referring to FIGS. 2 and 3, a light transmission module according to an embodiment of the present invention includes a light device module 20, a connector module 10 coupled to the light device module 20, and a coupling means for coupling the light device module 20 and the connector module 10.

The light device module 20 converts an electrical signal into a light signal or vice versa. The light device module 20 includes a socket member 21 and a light device 25 installed within the socket member 21.

In the socket member 21, a plurality of leads 22 electrically connected to the light device 25 are installed, and a plurality of pins 24 extending from the respective leads 22 project toward the lower portion of the socket member 21. The socket member 21 is preferably made of plastic.

Figure 4A:
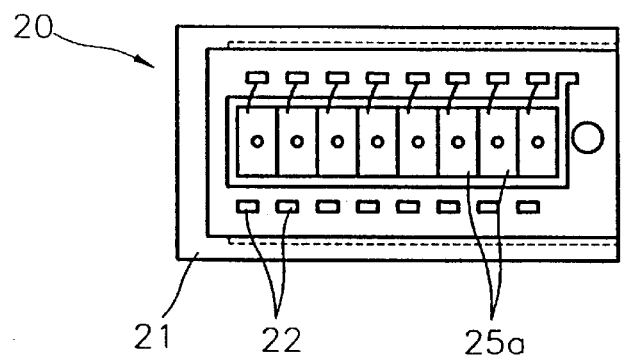
FIGS. 4A through 4C are schematic plan views illustrating various embodiments of a light device provided in a light device module shown in FIG. 2.

In the case of a light transmitting module, as shown in FIG. 4A, a surface emitting laser array 25a is employed as the light device (25 of FIG. 2). The surface light laser array 25a includes at least one surface emitting laser for emitting laser beams in the stacked direction of a semiconductor material layer according to an electrical signal input through the pins 24.

The surface emitting laser is easily fabricated in an array and can be coupled to the optical fiber without any additional optical coupling means because the emission angle of the beam emitted therefrom is small and the shape of the beam is substantially circular.

Figure 4B:
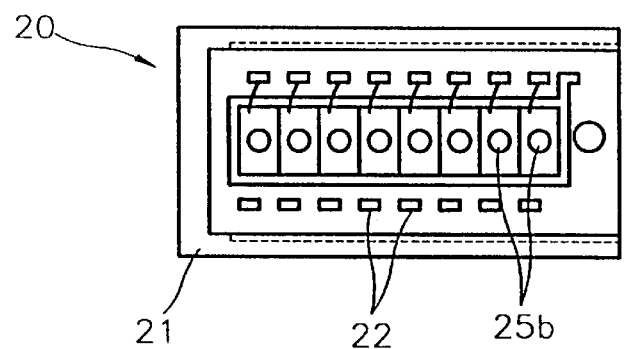

Also, in the case of a light receiving module, as shown in FIG. 4B, a photodetector array 25b having at least one photodetector for converting the received light signal into an electrical signal is employed as the light device (25 of FIG. 2). The output of the converted electrical signal from the photodetector array 25b is provided through the pins 24.

Figure 4C:
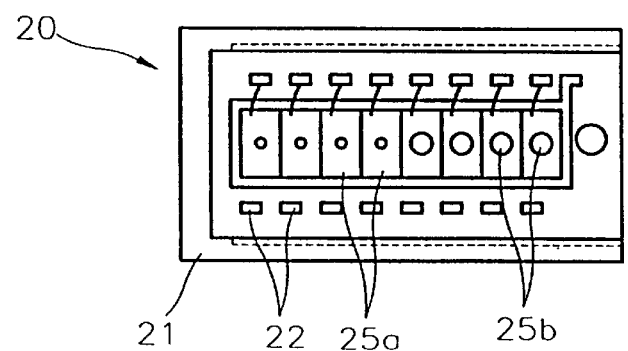

In the case of a light transmitting/receiving module, as shown in FIG. 4C, a surface emitting laser array 25a having at least one surface emitting laser and a photodetector array 25b having at least one photodetector are employed as the light device (25 of FIG. 2). In this case, the light device module 20 converts an input electrical signal into a light signal to then transmit the same through the connector module 10, and converts a light signal transmitted through the connector module 10 into an electrical signal.

Here, the light device 25 has arrays corresponding to the number of bits of a signal to be transmitted.

The connector module 10 includes a holder 11 slidably connected to the socket member 21 by the coupling means and at least one optical fiber 15 installed in the holder 11. The holder 11 is a ferrule made of plastic and has the optical fiber 15 installed in an array. Here, an entrance and/or an exit of the optical fiber 15 are disposed in the front surface 11a of the holder 11. The holder 11 is slidably coupled to the socket member 21 at the open side (A) formed at one side of the socket member 21 by the coupling means.

Here, the holder 11 and the socket member 21 are formed so as to make the entrance/exit of the optical fiber 15 spaced apart from the light device 25 by an appropriate distance in consideration of the emission angle of the surface emitting laser. Then, the light emitted from the surface emitting laser can be coupled to the optical fiber 15 without an additional optical coupling means. FIGS. 2 and 3 show an example in which both longitudinal sides of the front surface 11a of the holder 11 protrude so that the entrance/exit of the optical fiber 15 and the light device 25 are spaced apart from each other by a predetermined distance.

The optical fiber 15 is provided in the form of a bundle corresponding to the light device 25. Here, the optical fiber 15 is preferably made of plastic. For example, the plastic optical fiber has a diameter of about 0.5~1.0 mm and thus is capable of being supported by the holder 11 according to this embodiment without using an expensive ferrule.

The coupling means includes a pair of guide slots 41 formed along both side walls of the socket member 21 and a pair of guide protrusions 43 protruding at both longitudinal sides of the holder 11 and slidably inserted into the respective guide slots 41. Preferably, the guide slots 41 have V-shaped cross-sections and the guide protrusions 43 are V-shaped so as to be coupled to the V-shaped guide slots 41. Alternatively, the guide slots 41 may be provided in the holder 11 and the guide protrusions 43 may be provided in the socket member 21. Also, the guide slots 41 and the guide protrusions 43 may be modified to have various mated shapes respectively.

As shown in FIG. 3, it is preferred that one or more electrical wires 35 and 36 are further installed in the holder 11. The electrical wires 35 and 36 are electrically connected to the leads 22 by an electric connection means.

The electric connection means includes first electrode layers 31 formed at the respective guide slots 41 and second electrode layers 33 formed at the respective guide protrusions 43. The first electrode layers 31 are electrically connected to the leads 22, i.e., pins 24a and 24b, respectively. The second electrode layers 33 are electrically connected to the electrical wires 35 and 36, respectively. Therefore, during coupling between the connector module 10 and the light device module 20, the pins 24a and 24b, through which an electrical input/output signal is input/output are electrically connected to the electrical wires 35 and 36 by the electric connection means.

Therefore, power necessary for driving devices including the light device 25 can be supplied from another device through the electrical wires 35 and 36, and can be supplied to another device to be used for driving the same. Alternatively, a plurality of electrical wires 35 and 36 are provided, the first and second electrode layers 31 and 33 are comprised of discontinuous patterns corresponding to each other and the patterns are connected to the leads 22 so that an electrical signal having a predetermined number of bits can be transmitted.

As described above, the light transmission module provided with the electrical wires 35 and 36 and the electric connection means can transmit/receive an electrical signal as well as a light signal through the optical fiber 15.

It is preferred that a reference hole 51 is formed at one side, i.e., the open side (A), of the socket member 21 and a guide member 53 inserted into the reference hole 51 is further provided. The guide member 53 supports the connector module 10 when coupled to the light device module 20 for alignment. Here, a groove, e.g., a V-shaped groove, is formed at one side of the holder 11 so that the holder 11 is aligned by the guide member 53 when inserted into the reference hole 51.

Also, it is preferred that an elastic biasing means 55 for elastically biasing the connector module 10, coupled to the light device module 20, to the guide member 53 is further provided in the socket member 21 opposite to the open side (A). The elastic biasing means may include an elastic spring 56 and a panel member 57 for pushing the holder 11 toward the guide member 53 by an elastic force of the elastic spring 56.

Figure 1:
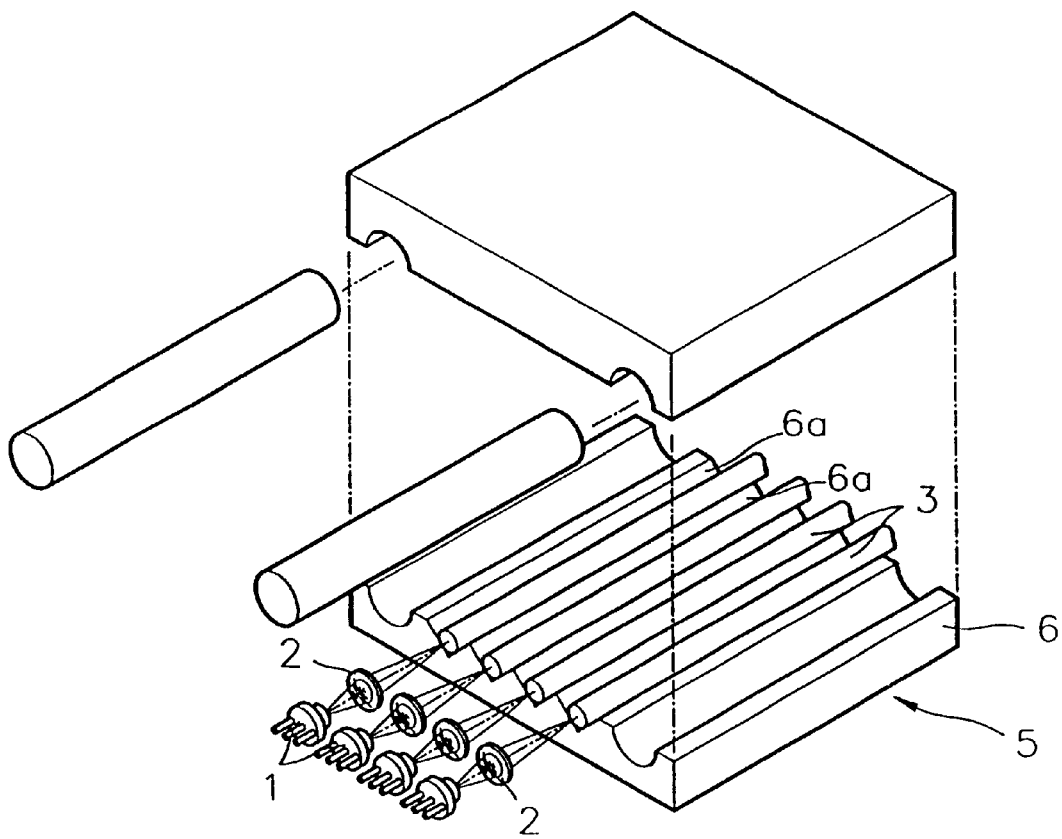
FIG. 1 is a schematic perspective view illustrating a conventional light transmission module.

Now, the assembled state of the light transmission module according to an embodiment of the present invention will be described with reference to FIGS. 1 and 4.

First, the light device 25 is positioned at a predetermined location of the socket member 21, made of plastic, and then is connected to the leads 22. Then, the elastic spring 56 to which the panel member 57 is adhered is fixed to the socket member.

The holder 11 in which the optical fiber 15 and the electrical wires 35 and 36 are mounted, is positioned and pushed so that the guide protrusions 43 are inserted into the guide slots 41 from the open side (A) of the socket member 21. Then, the holder 11 is inserted into the socket member 21 by sliding.

Thereafter, when the guide member 53 is inserted into the reference hole 51, the holder 11 is elastically biased to the guide member 53 by the elastic biasing means 55 such that one lateral surface 11b of the holder 11 firmly contacts the guide member 53. Then, the light device module 20 and the connector module 10 are aligned so that the optical axes thereof are automatically matched to each other.

Therefore, in the light transmission module according to an embodiment of the present invention, the light device 25 and the optical fiber 15 are passively aligned. Also, since a light signal is transmitted between two devices, high-speed signal transmission is allowed. At the same time, an electrical signal, e.g., a power signal, can also be transmitted.

For example, an image signal can be transmitted at a high speed by simply installing the light transmission module according to the present invention between a computer main body and a display device, and the power of the main body can also be used as a power source of the display device.

Also, the light transmission module according to the present invention can be used directly in a port of a predetermined device by modifying the arrangement of the pins 24 of the socket member 21 so as to be adaptable to the port of the device.

Figure 5:
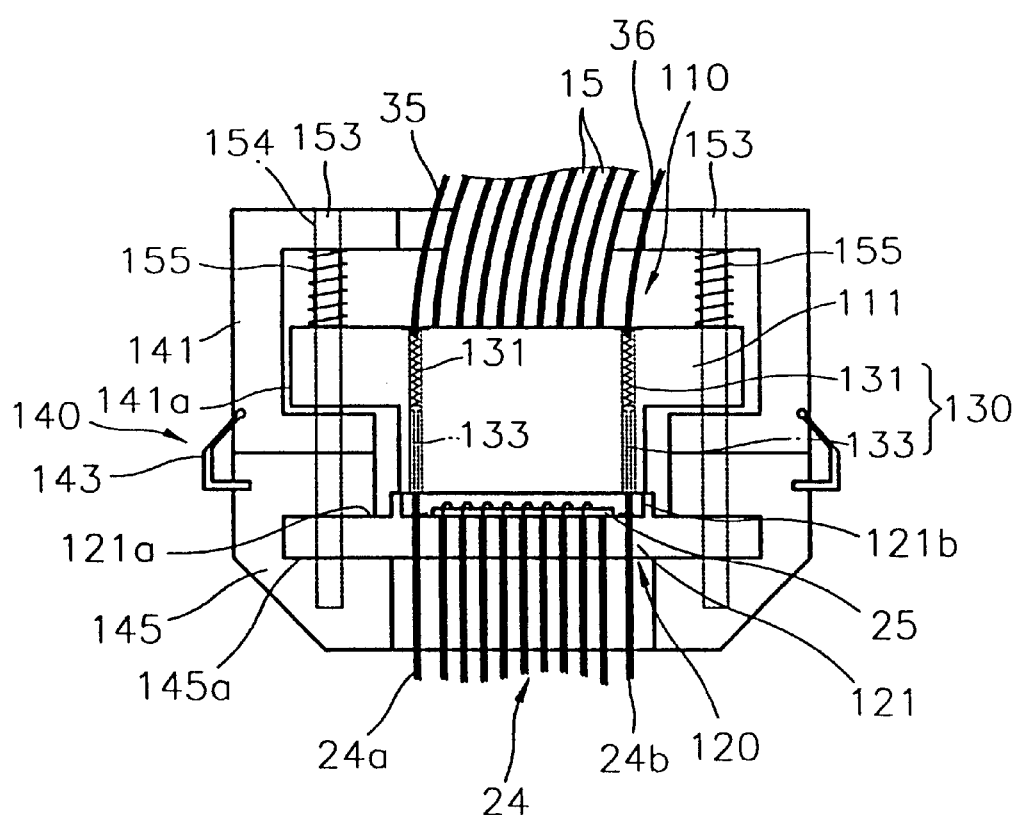
FIG. 5 is a schematic front view illustrating a light transmission module according to another embodiment of the present invention.

FIG. 5 is a schematic front view illustrating a light transmission module according to another embodiment of the present invention.

Referring to the drawing, the light transmission module according to another embodiment of the present invention includes a light device module 120, a connector module 110 and a coupling means 140 for packaging the light device module 120 and the connector module 110. Also, preferably, an electric connection means 130 for electrically connecting the light device module 120 with the connector module 110 may be further provided.

Figure 6:
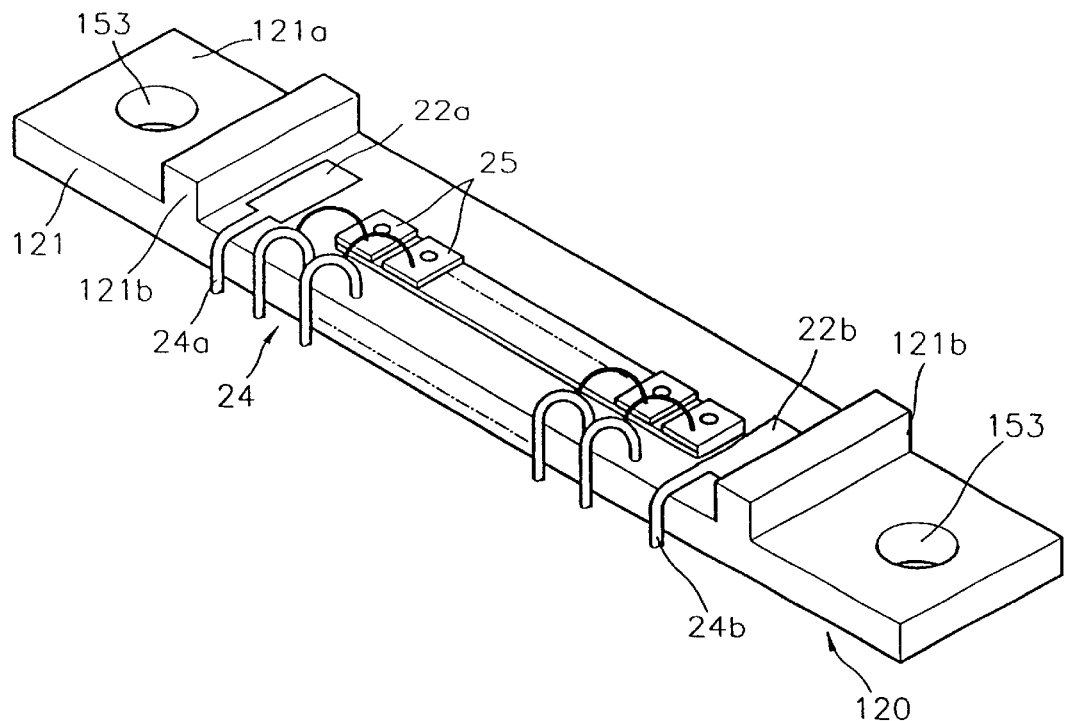
FIG. 6 is a perspective view illustrating a light device module shown in FIG. 5.

The light device module 120, as shown in FIG. 6, includes a base 121, a plurality of pins 24 installed at one side of the base 121, for transmitting an electrical signal, and a light device 25 installed on a surface facing the connector module 110 of the base 121 and electrically connected to the plurality of pins 24.

The base 121 is connected to the connector module 110 by the coupling means 140. Protrusions 121b are symmetrically provided on a top surface 121a facing the connector module 110 of the base 121, by which the light device 25 is installed at the base 121 to be spaced apart a predetermined distance from the connector module 110. The light device 25 has been described with reference to FIGS. 4A through 4C and will not be described again.

As described above, the distance between the light device 25 and the optical fiber is defined by the height of the protrusions 121b. Thus, the light emitted from the surface emitting laser can be coupled to the optical fiber 15 without a separate coupling means, by adjusting the height of the protrusions 121b appropriately in consideration of an emission angle of the light device 25, e.g., a surface emitting laser.

The plurality of pins 24 are supported by the base 121 and are electrically connected to the light device 25 by wires. In the case of a light transmitting module, if an electrical signal is transmitted from a predetermined controlling means (not shown) to a surface emitting laser array 25a through the pins 24, a light signal is emitted from the respective surface emitting lasers which constitute the surface emitting laser array 25a and coupled to the optical fiber for transmission. Also, in the case of a light receiving module, the light signal transmitted through the optical fiber 15 is converted into an electrical signal by a photodetector array 25b for output through the respective pins 24.

Figure 7:
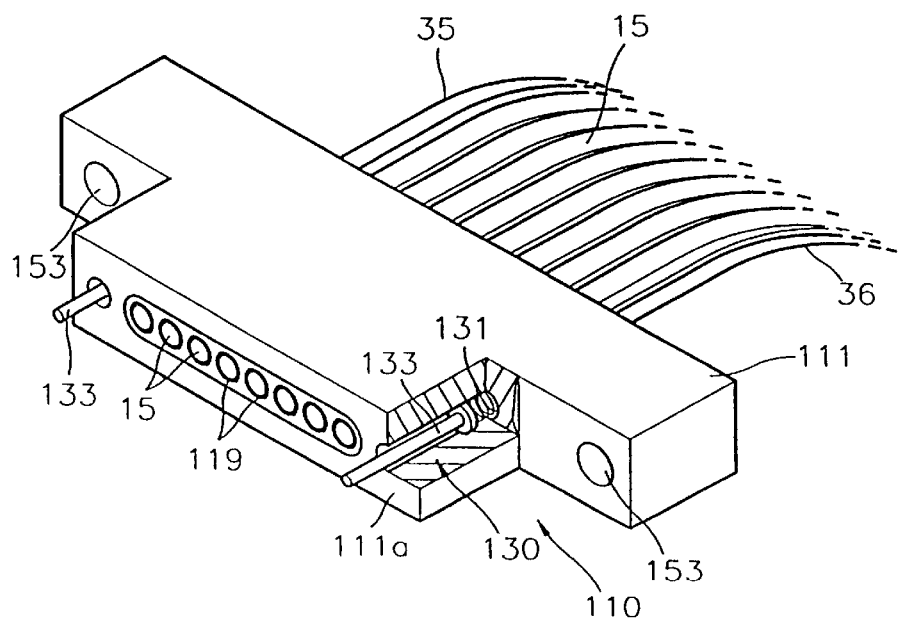
FIG. 7 is a perspective view illustrating a connector module shown in FIG. 5.

As shown in FIG. 7, the connector module 110 includes a holder 111 coupled to the light device module 120 by the coupling means 140 and at least one optical fiber 15 installed in the holder 111. Also, one or more electrical wires 35 and 36 are installed in the connector module 110.

The holder 111 has at least one installation hole 119, as in a conventional electric connector used for electrical connection, and may be formed of plastic. The optical fiber 15 is installed in each installation hole 119 of the holder 110 for support. As the optical fiber 15, a band-shaped bundle may be employed. Here, the optical fiber 15 is preferably made of plastic. For example, the plastic optical fiber 15 has a diameter of about 0.5~1.0 mm and thus is capable of forming the connector module 110 by employing the holder 111 according to this embodiment without using an expensive ferrule.

The connector module 110 provided as described above is a multi-channel connector module which can transmit light signals from multiple channels simultaneously.

The electrical wires 35 and 36 are fixed in the holder 111 and are electrically connected to the pins 24a and 24b by the electric connection means 130. Here, leads 22a and 22b, connected to the pins 24a and 24b, are provided on a surface facing the connector module 110 of the base 121.

The electric connection means 130 is a contact-type electrode member and, as shown in FIG. 7, includes an elastic spring 131 connected to the electrical wires 35 and 36 and electrically conductive, and a contact rod 133 elastically biased by the elastic spring 131 and contacting the leads 22a and 22b. If the connector module 110 is coupled to the light device module 120, the contact rod 133 firmly contacts the leads 22a and 22b by the elastic spring 131 to then electrically connect the electrical wires 35 and 36 and the pins 24a and 24b.

The coupling means 140 includes first and second frames 141 and 145 on which the connector module 110 and the light device module 120 are installed, respectively, and clamping members 143 for coupling the first and second frames 141 and 145.

A first installation groove 141a through which the holder 111 is mounted is provided in the first frame 141. A second installation groove 145a through which the base 121 is mounted is provided in the second frame 145. Here, the second installation groove 145a is provided such that both sides of the base 121 are inserted thereinto to then be substantially fixed.

The clamping members 143 are installed on the first and second frames 141 and 145 and couple the first and second frames 141 and 145. Accordingly, the connector module 110 and the light device module 120, respectively installed on the first and second frames 141 and 145, are supported to face each other.

Preferably, an elastic member 155, i.e., an elastic spring, interposed between the first frame 141 and the holder 111 so as to surround guide members 153 to be described later, for elastically biasing the connector module 110 to the light device module 120, may be further provided. The holder 111 is elastically biased to the base 121 by the elastic member 155 so that a front surface 111a of the holder 111 and a protrusion 121b of a front surface 121a of the base 121 contact each other.

In this embodiment, a pair of guide members 153 for aligning the connector module 110 and the light device module 120 are preferably provided. The guide members 153 are inserted into the reference holes 154 installed in the holder 111, the base 121 and the first and second frames 141 and 145 so as to be aligned.

The aforementioned light transmission module is assembled as follows.

First, the connector module 110 and the light device module 120, i.e., the holder 111 and the base 121, are mounted into the installation grooves 141a and 145a of the first and second frames 141 and 145, respectively. Here, the first and second frames 141 and 145 are coupled to each other by the clamping members 143.

If a pair of elastic members 155 are positioned on the reference holes 154 between the first frame 141 and the holder 111 and a pair of guide members 153 are inserted into the reference holes 154, respectively, the optical axes of the connector module 110 and the light device module 120 are automatically matched to each other by passive alignment. Also, the connector module 110 is elastically biased to the light device module 120 by the elastic members 155 so that the front surface 111a of the holder 111 contacts the protrusion 121b of the top surface 121a of the base 121. Here, the contact rod 133 contacts the leads 22a and 22b to thus electrically connect the electrical wires 35 and 36 to the pins 24a and 24b.

The light transmission module according to above-described embodiments of the present invention can be employed in a system which necessitates high-speed signal transmission. For example, the light transmission module shown in FIGS. 2 or 5 can be applied for unidirectional high-speed signal transmission from the main body of a notebook computer to a display device and simultaneously can transmit both power and/or an electrical signal. Also, where the light transmission module is provided with a light device 25 shown in FIG. 4C, bidirectional signal transmission is possible.

As described above, the light transmission module according to the present invention does not necessitate a coupling means, thereby simplifying the it configuration thereof. Also, since a connector module having a plastic optical fiber and a plastic holder is employed, the fabrication cost is reduced.

In addition, passive alignment of a connector module and a light device module is allowed such that optical axes thereof are automatically matched when mounting the same. More over, assembly and disassembly are easy, which facilitates replacement of parts.

Further, electrical wires are used in the connector module and are electrically connected to pins by an electrical connection means, thereby enabling transmission of an electrical signal, in particular, power.

What is claimed is:

1. A light transmission module comprising:

a light device module having a socket member having a base, at least two opposing side walls and a plurality of leads for transmitting an electrical signal, and a light device installed within the socket member to be electrically connected to the leads, wherein said light device is an electrical signal to light signal converter, a light signal to electrical signal converter, or a combination of both;

a connector module having a holder for coupling with the socket member, and at least one optical fiber installed in the holder to face the light device, for transmitting a light signal, wherein said holder has at least two opposing peripheral walls;

a coupler for slidably coupling the socket member and the holder, wherein said coupler comprises a pair of first guide tracks longitudinally formed on said opposing side walls of the socket member, and a pair of second guide tracks longitudinally formed on said opposing peripheral walls of the holder, wherein said first guide tracks are slidably engageable with said second guide tracks;

at least one electrical wire installed at the holder, for transmitting an electrical signal; and an electrical connector having a pair of first electrode layers formed at the respective first guide tracks connected to the leads and a pair of second electrode layers formed at the respective second guide tracks connected to said at least one electrical wire.

2. The light transmission module according to claim 1, further comprising:

a reference hole formed at one end of said base of the socket member; and a guide member inserted into the reference hole so that the holder and socket member are aligned when coupled.

3. The light transmission module according to claim 1, further comprising an elastic biaser installed in the socket member such that the holder is biased toward the guide member when the holder and guide member are coupled.

4. The light transmission module according to claim 1, wherein the light device is at least one converter selected from the group consisting of a surface emitting laser array including at least one surface emitting laser for emitting laser beams in the staked direction of a semiconductor material layer according to an input electrical signal and a photodetector array including at least one photodetector for receiving an incident light signal and converting the same into an electrical signal.

* * * * *